Aug. 7, 1934.　　　　　F. T. HOWARD　　　　　1,969,647
CONTOUR COPYING MACHINE
Filed Aug. 12, 1930　　　　2 Sheets-Sheet 1
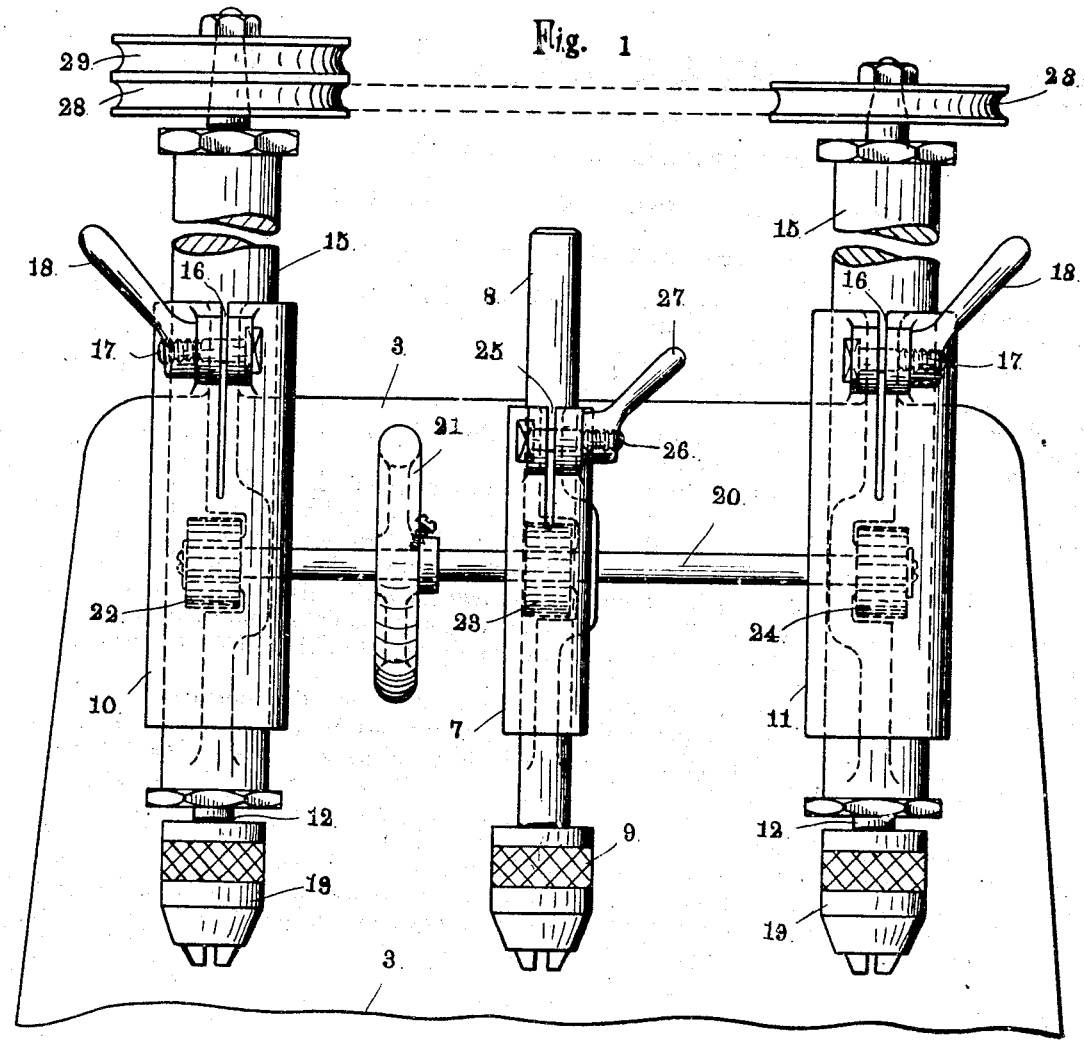
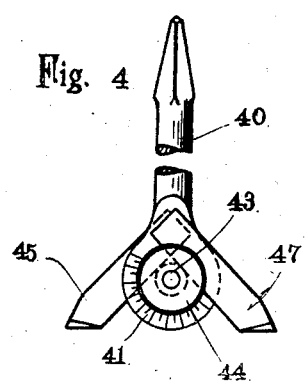
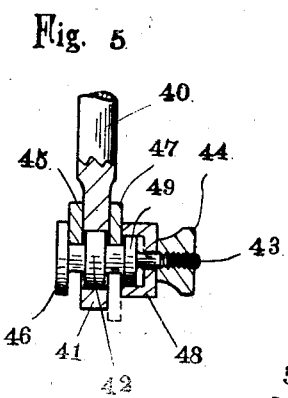
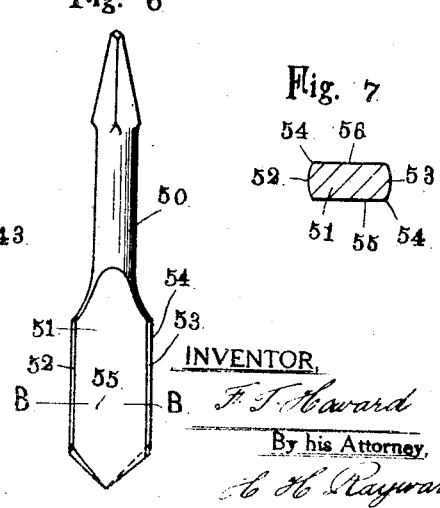
WITNESSES
INVENTOR,
F. T. Howard
By his Attorney, Aug. 7, 1934.  F. T. HOWARD  1,969,647
CONTOUR COPYING MACHINE
Filed Aug. 12, 1930  2 Sheets-Sheet 2
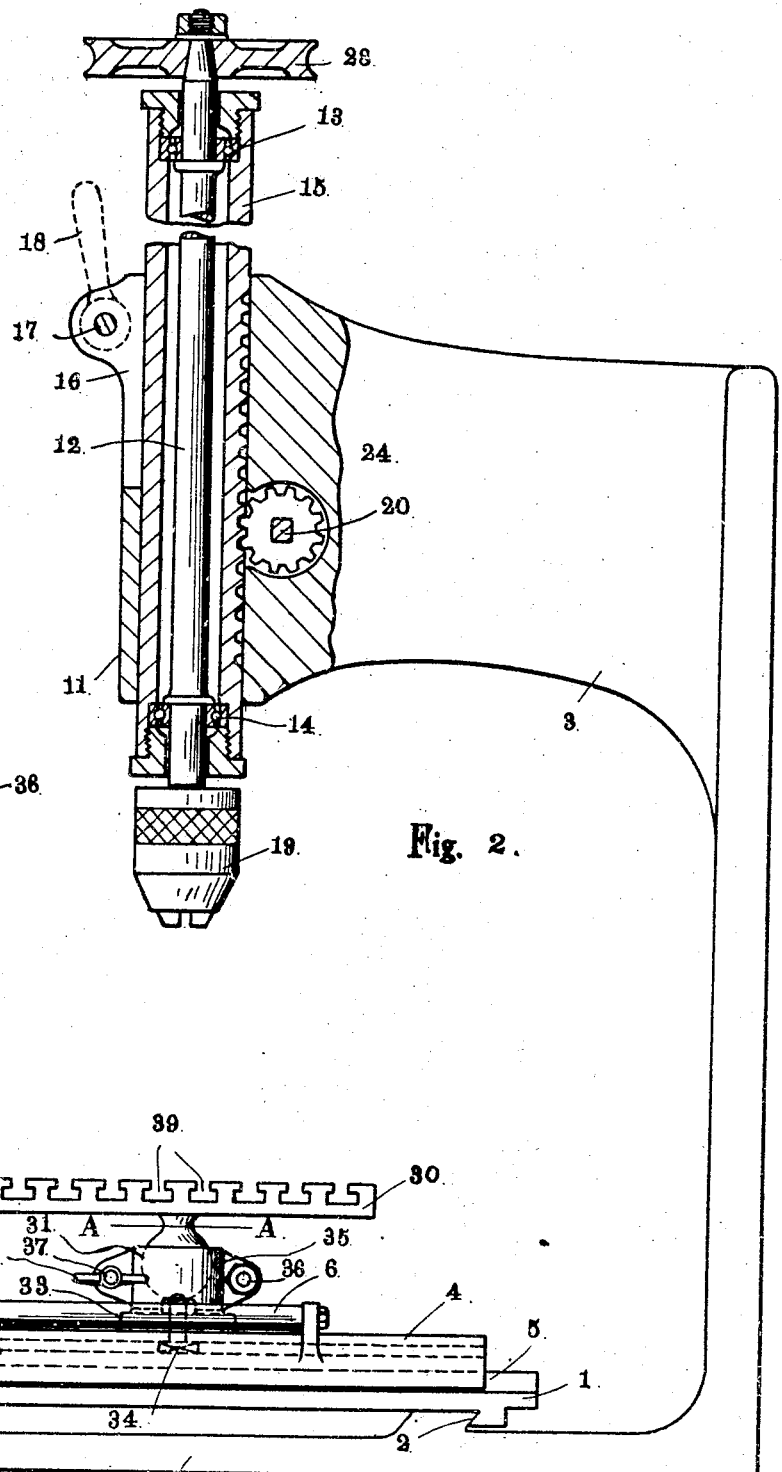

Patented Aug. 7, 1934

1,969,647

UNITED STATES PATENT OFFICE 1,969,647

CONTOUR COPYING MACHINE

Frederick Thomas Howard, Paddington, near Sydney, New South Wales, Australia

Application August 12, 1930, Serial No. 474,781
In Australia June 10, 1929

2 Claims. (Cl. 90—13.2)

The invention relates to the production of articles of wood, metal and other material to conform with the contour of a master specimen or model.

According to my invention two slidable tables are employed one super-imposed on the other, each capable of movement in a horizontal plane, and one movable only at right angles to the other.

The model of which one or a plurality of copies is or are to be made is fixed upon the upper table which has a series of channels or slots for the heads of T clamping bolts.

A vertical guide spindle which I term copying stylus, is carried in a bracket, wherein it is capable of vertical adjustment, projecting from the frame of the machine.

Vertical cutter spindles having suitably shaped cutting and boring heads upon their lower ends are rotatable in vertical bearings and driven from any convenient source.

The material to be shaped is fixed to the table beneath the cutting heads.

Handles upon the upper table enable both tables to be slid simultaneously, one longitudinally, the other laterally, whereby the pattern may by contact with the copying stylus so limit and control the movement of the tables that the contour of the pattern is reproduced by the cutter heads upon the material beneath them.

The cutter spindles are operable vertically by rack and pinion or other gear, and, connecting mechanism which may be tooth gearing connects the spindles so that their vertical movement is synchronized.

There may be an anti-friction runner upon the copying stylus and generally it will be of the same diameter as the cutter heads.

In order to provide for the cutting of a profile having a bevelled edge a swivel table, adjustable to any angle likely to be required, is carried upon the uppermost of the two slidable tables referred to.

The angling is effected by a ball and socket device, the ball being fixed upon the underside of the swivel table and the socket in which it may be clamped fixed upon the slidable table.

Special cutters hereinafter described have been devised for cutting bevelled and other contours in materials having different qualities.

My invention is illustrated in the accompanying drawings wherein:—

Fig. 1 is a part front elevation.

Fig. 2, an end elevation partly in section.

Fig. 3, a sectional plan on A A Fig. 2.

Fig. 4, a front elevation of a tool for cutting a bevelled contour.

Fig. 5, a side elevation thereof partly in section.

Fig. 6, a front elevation of a cutter tool and

Fig. 7, a sectional plan on B B Fig. 6.

The table 1 is slidable in guides 2 in the frame 3 of the machine while the superposed table 4 is slidable in guides 5 upon table 1 and at right angles thereto.

Handles 6 upon table 4 provide for manual operation of both tables simultaneously.

Projecting from frame 3 is a vertical bracket 7 in which is slidable vertically a spindle 8 having at its end a tool grip 9 of ordinary construction in which is carried a copying stylus of the usual type.

Brackets 10 and 11 also projecting from frame 3 are each provided with similar mechanism as follows:—

A vertical spindle 12 is rotatable in ball bearings 13, 14 carried in a tubular sleeve 15 slidable vertically in the bracket which has a saw cut 16 and a clamping screw 17 operated by a handle 18 by which the sleeve may be clamped in the bracket.

Upon the lower end of spindle 12 is a cutter holder 19 of ordinary type which holds a cutter tool by which the contouring is effected.

Vertical adjusting movement is simultaneously imparted to the spindle of the copying stylus and the spindles of the two contour cutters by a common spindle 20 turnable by a hand wheel 21 and having fixed upon it the pinions 22—23—24 which gear with teeth formed in the sleeves 15 and in the spindle 8.

Bracket 7 has a saw cut 25 and spindle 8 is clamped within the bracket by a clamping screw 26 operated by a handle 27.

Band sheaves 28 upon each of the spindles 12 are connected by a driving band and rotary motion is conveyed from any convenient source to a driving sheave 29 fixed upon one of the spindles.

The swivel table 30 has an integral spherical projection 31 adapted to fit a socket 32 upon a bracket 33 fixed to the slidable table 4 by bolts 34.

Socket 32 has a removable part 35 which is secured to the main part by a bolt 36 and a bolt 37 upon which is a wing nut 38.

It will be seen that the table may be swivelled to a desired angle and clamped thereat by screwing up the wing nut.

The material to be operated upon is fixed to the top of the swivel table by bolts passed into the T slots 39.

Referring to Figs. 4 and 5 the cutter bar 40 has an eye 41 into which passes a collar 42 upon a spindle 43 the end of which is screwed and provided with a knurled nut 44.

By screwing up nut 44 an angled cutter tool 45 is clamped between eye 41 and a head 46 upon spindle 43 and a similar tool 47 clamped between eye 41 and a recessed washer 48 which is sleeved upon spindle 43 and receives a collar 49 integral with the spindle.

To facilitate adjustment of the cutter tools 45—47 to the same desired angle, the face of eye 41 has radial markings upon it indicating the same angles upon each side of the axial line of the cutter bar.

Referring to Figs. 6 and 7 which illustrate a cutter particularly useful when a number of articles are to be simultaneously made of the same contour.

The cutter bar 50 is integrally formed with a cutter head 51 which is approximately rectangular but has two sides 52 and 53 curved concentrically with the bar.

The cutting is done by the edges 54 and sharpening is effected by grinding the sides 55 and 56 so that the radial position of the cutting edges relative to the centre of the cutter bar is not altered.

When desired one cutter spindle only may be used the other parts of the apparatus remaining substantially the same.

When the swivel table is not required it is removed with scoket 32 by unscrewing the bolts 34. Articles to be operated upon are then bolted directly to table 4.

I claim:

1. A contour copying machine by which a plurality of replicas is produced comprising in combination a table, guides therefor whereby it is slidable only in one direction, a second table superposed upon the first table, guides therefor upon the first table whereby the second table is slidable at right angles to the direction of movement of the first table, handles upon the second table by which both tables are independently manually operated, a swivel table superposed the second table, swivelling means by which the swivel table is connected to the second table, a plurality of vertically slidable cutter spindles, means for simultaneous rotation of the spindles, a vertically slidable stylus spindle, a stylus tool carried therein, and means for coincidental vertical adjustment of the cutter spindles and the stylus spindle as specified.

2. In apparatus for the purpose indicated in combination two slidable tables one superposed the other, guiding means whereby the tables are capable of independent movement each in one direction only the movement of one table being at right angles to the direction of movement of the other, handles upon the uppermost table by which both tables are independently manually operated, a swivel table superposed the upper table, a socket upon the upper table and a spherical projection upon the swivel table received in the socket, and clamping means whereby the spherical projection is fixable in the socket as specified.

FREDERICK THOMAS HOWARD.